United States Patent [19]
Kendrick et al.

[11] 3,890,405
[45] June 17, 1975

[54] POLYALPHAMETHYLSTYRENE-POLYDIMETHYLSILOXANE BLOCK COPOLYMERS SUITABLE AS BLOWN FILMS

[75] Inventors: Thomas C. Kendrick; Andrew H. Ward, both of Midland, Mich.

[73] Assignee: Dow Corning Corporation, Midland, Mich.

[22] Filed: July 26, 1973

[21] Appl. No.: 383,014

[52] U.S. Cl. .................. 260/827; 260/874; 260/886
[51] Int. Cl. ....................... C08f 33/08; C08g 31/09
[58] Field of Search ..................... 260/827, 874, 886

[56] References Cited
UNITED STATES PATENTS 3,665,052   5/1972   Saam et al. ........................ 260/827

Primary Examiner—Wilbert J. Briggs, Sr.
Attorney, Agent, or Firm—Roger H. Borrousch

[57] ABSTRACT

Block copolymers of polyalphamethylstryene and polydimethylsiloxane having organic blocks of from 2,000 to 7,000 molecular weight with a total molecular weight from 30,000 to less than 500,000, having from 15 to 60 weight percent organic and 40 to 85 weight percent polydimethylsiloxane and having a melt flow index greater than 1.0 are suitable for making blown films.

2 Claims, No Drawings

POLYALPHAMETHYLSTYRENE-
POLYDIMETHYLSILOXANE BLOCK
COPOLYMERS SUITABLE AS BLOWN FILMS

This invention relates to specific block copolymers which can be used to make blown films.

The general class of polyalphamethylstyrene-polydimethylsiloxane block copolymers are known from U.S. Pat. No. 3,665,052 which is hereby incorporated by reference to cover the method of preparation for the block copolymers. These block copolymers of U.S. Pat. No. 3,665,052 are prepared by polymerizing alphamethylstryene with a lithium initiator at about −70°C., a small amount of styrene is then added and polymerized onto the poly-alpha-methylstryene before the temperature is raised to ambient temperature to polymerize polydiorganocyclosiloxanes thereby forming a block copolymer. U.S. Pat. No. 3,665,052 describes a broad spectrum of block copolymers which contain polyalphamethylstryene blocks, polystyrene blocks and polydiorganosiloxane blocks. These block copolymers vary from low molecular weight materials of 7,000 to extremely high molecular weight materials and from materials which have one block of each polymeric material to those having many blocks of each polymeric material. These block copolymers are described as varying from thermoplastics to elastomers and are described as film formers. Within this broad spectrum of block copolymers, it now has been found that certain block copolymers can be used to make films by the blowing procedure if certain defined parameters are used as opposed to films made by solution casting, by drawing and other such procedures.

It is therefore an object of this invention to provide block copolymers which are suitable for making blown films. This object and others will become apparent from the following detailed description.

This invention relates to a block copolymer suitable for making blown films consisting essentially of polyalphamethylstyrene blocks bonded at each terminal end to polystyrene blocks and in turn the polystyrene blocks are bonded to polydimethylsiloxane blocks, each repeating block unit of one polyalphamethylstyrene block and two polystyrene blocks having a molecular weight of at least 2,000 but less than 7,000 and the total molecular weight of said block copolymer being from 30,000 to less than 500,000 and there being an average of at least 3 polyalphamethylstyrene blocks and at least 4 polydimethylsiloxane blocks per molecule in said block copolymer, said block copolymers being terminated with polydimethylsiloxane blocks wherein the end blocking groups are hydroxyl groups or trimethylsiloxy groups, wherein the combined weight of the polyalphamethylstyrene and polystyrene in the block copolymer is from 15 to 60 weight percent based on the total weight of the block copolymer and the amount of the polydimethylsiloxane is from 40 to 85 weight percent based on the total weight of the block copolymer, said polystyrene blocks being present in an amount to provide no more than 18 weight percent based on the combined weight of the polyalphamethylstyrene and polystyrene present, said block copolymers have a melt flow index greater than 1.0 as determined by the procedure of ASTM:D-1238-L.

It was totally unexpected that certain block copolymers, as defined above, could be used to make blown films. The block copolymers of the present invention must be within the scope of the limitations set forth above to be suitable materials for use in making blown films. If each of the limitations are not met, the block copolymers will not be useful as blown films because they cannot be processed by the blowing procedure, such as, they have insufficient strength or are too stiff.

The only block copolymers of the polyalphamethylstyrene-polydimethylsiloxane type found which can be blown into useful films are those which contain repeating block units of one polyalphamethylstyrene block and two terminally bonded polystyrene blocks wherein the molecular weight is at least 2,000 but less than 7,000. However, if the total molecular weight is below 30,000, the physical strength of the block copolymer is too low to be useful for blowing films. Thus, even if the repeating block units have molecular weights between 2,000 and 7,000, and the total molecular weight is not greater than 30,000, the strength will be too low to permit the blowing of films. In addition to the above two parameters, the combined weight of the alphamethylstyrene and styrene in the block copolymer must be between 15 and 60 weight percent and the polydimethylsiloxane between 40 and 85 weight percent. If the weight of the polydimethylsiloxane is outside the limits set forth above, the physical strength is insufficient to permit the blowing of films. Additionally, even if the parameters for the repeating block unit molecular weight, the total block copolymer molecular weight and the weight percentages are met, the block copolymers will only be suitable for the blowing of films, if the average number of polyalphamethylstyrene blocks per molecule is greater than three and the average number of polydimethylsiloxane blocks per molecule is greater than four. Preferably, the average number of polyalphamethylstyrene blocks per molecule is greater than 5 and the average number of polydimethylsiloxane blocks per molecule is greater than 6.

Finally, there exists some undetermined and as yet unknown relationship between the suitability of a block copolymer for use in making blown films and the above stated parameters. For example, not all block copolymers which have the above defined parameters are suitable for making blown films, but there appears to be a relationship between the molecular weight of the repeating block units of one polyalphamethylstyrene block and two polystyrene blocks and the total molecular weight of the block copolymer. The relationship appears to be that the repeating block units which contain the polyalphamethylstyrene block and of lower molecular weight can be used in block copolymers of higher total molecular weight and still provide satisfactory blown films, than can the repeating block units which contain the polyalphamethylstyrene and of molecular weights approaching 7,000. Because this relationship is undetermined and unknown at the present time, this invention should not be limited by such theory. However, it has been found that if all the other parameters are met, those block copolymers having these parameters but which are not suitable for making blown films can be excluded by determining the melt flow index by the procedure set forth in ASTM:D-1238 -L which is basically a barrel-capillary extrusion experiment at 230°C. and a 2.16 kilogram load wherein the results are reported as the amount extruded in ten minutes. Those block copolymers which have a melt flow index of greater than 1.0 can be used in making blown films but those which have a melt flow index of less than 1.0 cannot be used to make blown film. Preferably, the melt flow index of the block copolymer is greater than 2.5. Thus, the melt flow index can be used to exclude those block copolymers which meet all other above stated parameters but cannot be used to make blown films.

These block copolymers should not contain more than 18 weight percent polystyrene based on the combined weight of the polyalphamethylstyrene and polystyrene. Block copolymers which contain more than 18 weight percent polystyrene begin to lose the desirable polyalphamethylstyrene characteristics.

Preferably, the block copolymers have a repeating block unit of one polyalphamethylstyrene block and two polystyrene blocks of from 2,000 to 6,800 molecular weight units with a total block copolymer molecular weight of 50,000 to 300,000 with from 25 to 50 weight percent alphamethylstyrene and styrene wherein said block copolymers have a melt flow index greater than 2.5.

The block copolymers of this invention can be made by the method described in U.S. Pat. No. 3,665,052. The block copolymers in the following example are made by the method of the above stated patent wherein the prepolymers are coupled by using methyl-3,3,3-trifluoropropyldichlorosilane and the terminal groups on the terminal polydimethylsiloxane blocks are hydroxyl groups.

The following example is presented for illustrative purposes only and should not be construed as limiting the present invention which is properly delineated in the claims.

EXAMPLE

Block copolymers shown in the Table were found useful in making blown films by conventional film blowing processes except for block copolymers designated No. 7 and No. 8. In the Table "% A" equals the weight percent of alphamethylstyrene and styrene in the block copolymer, "$\overline{M}_A$" equals the molecular weight of the repeating block unit of one polyalphamethylstyrene block and two polystyrene blocks, "$\overline{M}_w$" equals the total molecular weight of the block copolymer. The weight percentage of polydimethylsiloxane can be obtained by substracting the %A from 100 and the amount of polystyrene is 3 weight percent in each block copolymer.

TABLE

| Block Copolymer No. | % A | $\overline{M}_A$ | $\overline{M}_w$ | Melt Flow Index (L) | Tensile Strength at break, p.s.i. | Elongation at break, % |
|---|---|---|---|---|---|---|
| 1 | 25 | 2,000 | 272,000 | 5.1 | 650 | 1000 |
| 2 | 50 | 5,510 | 74,900 | 17.7 | 1530 | 380 |
| 3 | 50 | 6,500 | 87,900 | 2.7 | 1520 | 500 |
| 4 | 50 | 6,570 | 85,900 | 9.8 | 1251 | 410 |
| 5 | 50 | 6,640 | 99,700 | 10.0 | 975 | 210 |
| 6 | 50 | 6,730 | 97,200 | 6.8 | 1270 | 490 |
| 7* | 50 | 8,120 | 102,000 | 0.8 | 1228 | 550 |
| 8* | 30 | 6,500 | 431,000 | 0 | 1773 | 890 |

*Presented for comparative purposes only.

That which is claimed is:

1. A block copolymer suitable for making blown films consisting essentially of polyalphamethylstyrene blocks bonded at each terminal end to polystyrene blocks and in turn the polystyrene blocks are bonded to polydimethylsiloxane blocks, each repeating block unit of one polyalphamethylstyrene block and two polystyrene blocks having a molecular weight of at least 2,000 but less than 7,000 and the total molecular weight of said block copolymer being from 30,000 to less than 500,000 and there being an average of at least 3-polyalphamethylstyrene blocks and at least 4 polydimethylsiloxane blocks per molecule in said block copolymer, said block copolymers being terminated with polydimethylsiloxane blocks wherein the end blocking groups are hydroxyl groups or trimethylsiloxy groups, wherein the combined weight of the polyalphamethylstyrene and polystyrene in the block copolymer is from 15 to 60 weight percent based on the total weight of the block copolymer and the amount of the polydimethylsiloxane is from 40 to 85 weight percent based on the total weight of the block copolymer, said polystyrene blocks being present in an amount to provide no more than 18 weight percent based on the combined weight of the polyalphamethylstyrene and polystyrene present, said block copolymers have a melt flow index greater than 1.0 as determined by the procedure of ASTM:D-1238-L.

2. The block copolymer in accordance with claim 1 in which each repeating block unit of one polyalphamethylstyrene block and two polystyrene blocks is from 2,000 to 6,800, the total molecular weight of the block copolymer is from 50,000 to 300,000, the combined weight of the polyalphamethylstyrene and polystyrene is from 25 to 50 inclusive weight percent, there is an average at at least 5 polyalphamethylstyrene blocks and at least 6 polydimethylsiloxane blocks and the melt flow index is greater than 2.5.

* * * * *